US012482389B2

(12) United States Patent
Park et al.

(10) Patent No.: US 12,482,389 B2
(45) Date of Patent: Nov. 25, 2025

(54) DATA DRIVER INCLUDING FIRST TO THIRD DIGITAL-TO-ANALOG CONVERTERS AND MAIN AMPLIFIER, AND DISPLAY DEVICE INCLUDING THE DATA DRIVER

(71) Applicant: Samsung Display Co., Ltd., Yongin-Si (KR)

(72) Inventors: Kyungeun Park, Seongnam-si (KR); Donghyun Hwang, Anyang-si (KR); Dongkyu Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/891,882

(22) Filed: Aug. 19, 2022

(65) Prior Publication Data

US 2023/0078957 A1 Mar. 16, 2023

(30) Foreign Application Priority Data

Sep. 10, 2021 (KR) ........................ 10-2021-0120956

(51) Int. Cl.
*G09G 3/20* (2006.01)

(52) U.S. Cl.
CPC ......... *G09G 3/20* (2013.01); *G09G 2310/027* (2013.01); *G09G 2310/0291* (2013.01);
(Continued)

(58) Field of Classification Search
CPC ........................................................ G09G 3/20
See application file for complete search history.

(56) References Cited

U.S. PATENT DOCUMENTS

2002/0163460 A1 11/2002 Leung et al.
2005/0007393 A1* 1/2005 Akai .................... G09G 3/3291
345/690

(Continued)

FOREIGN PATENT DOCUMENTS

KR 10-2021-0076394 A 6/2021
TW 201236379 A1 9/2012

*Primary Examiner* — William Boddie
*Assistant Examiner* — Andrew B Schnirel
(74) *Attorney, Agent, or Firm* — Innovation Counsel LLP

(57) ABSTRACT

A data driver is disclosed that includes a first digital-to-analog converter, a second digital-to-analog converter, a third digital-to-analog converter, a first pseudo amplifier, a second pseudo amplifier, and a main amplifier. The first digital-to-analog converter includes a first resistor string including first resistors and a first decoder. The second digital-to-analog converter includes a second resistor string including second resistors and a second decoder, and is connected to the first digital-to-analog converter. The third digital-to-analog converter is connected to the second digital-to-analog converter. The first pseudo amplifier includes first and second driving transistors. The second pseudo amplifier includes third and fourth driving transistors. The main amplifier is connected to the first and second pseudo amplifiers, and is configured to generate a reference current. The second resistor string is connected between first and second nodes, and a first output node disposed between the first and second driving transistors is connected to the first node. A second output node disposed between the third and fourth driving transistors is connected to the second node.

20 Claims, 15 Drawing Sheets

(52) U.S. Cl.
CPC ............... *G09G 2320/0673* (2013.01); *G09G 2330/028* (2013.01)

(56) References Cited

U.S. PATENT DOCUMENTS

| | | | | |
|---|---|---|---|---|
| 2010/0225678 | A1* | 9/2010 | Kim | G09G 3/3696 345/84 |
| 2011/0032279 | A1* | 2/2011 | Kim | G09G 3/2007 345/89 |
| 2011/0096054 | A1* | 4/2011 | Cho | G09G 3/3685 345/87 |
| 2013/0069999 | A1* | 3/2013 | Herrmann | G09G 3/3685 345/89 |
| 2017/0358277 | A1* | 12/2017 | Yamazaki | G09G 3/3688 |
| 2018/0183451 | A1 | 6/2018 | Lee et al. | |
| 2021/0183293 | A1 | 6/2021 | Piao et al. | |

* cited by examiner

DATA DRIVER INCLUDING FIRST TO THIRD DIGITAL-TO-ANALOG CONVERTERS AND MAIN AMPLIFIER, AND DISPLAY DEVICE INCLUDING THE DATA DRIVER

CROSS-REFERENCE TO RELATED APPLICATION

This application claims priority under 35 USC § 119 to Korean Patent Application No. 10-2021-0120956 filed on Sep. 10, 2021 in the Korean Intellectual Property Office (KIPO), the entire disclosure of which is incorporated herein by reference.

BACKGROUND

1. Field

The present disclosure relates to a data driver and a display device including a data driver.

2. Description of the Related Art

Flat panel display devices are used as display devices for replacing a cathode ray tube display device due to light-weight and thin characteristics thereof. As representative examples of such flat panel display devices, there are liquid crystal display devices, organic light emitting diode display devices, quantum dot display devices, and the like.

An organic light emitting diode display device or a quantum dot display device may include a display panel, a data driver, a scan driver, a controller, and the like. The display panel may include scan lines, data lines, and pixels (e.g., a transistor, a light emitting element, etc.) connected thereto. The scan driver may provide scan signals to the pixels through the scan lines, and the data driver may provide data voltages to the pixels through the data lines. The controller may control the scan driver and the data driver. In this case, the data driver may include at least two digital-to-analog converters, and the digital-to-analog converter may include a resistor string in which a plurality of resistors are connected in series, a decoder, and the like.

SUMMARY

Embodiments provide a data driver.

Embodiments provide a display device including a data driver.

According to an embodiment of the present disclosure, a data driver includes a first digital-to-analog converter, a second digital-to-analog converter, a third digital-to-analog converter, a first pseudo amplifier, a second pseudo amplifier, and a main amplifier. The first digital-to-analog converter includes a first resistor string including first resistors and a first decoder. The second digital-to-analog converter includes a second resistor string including second resistors and a second decoder, and is connected to the first digital-to-analog converter. The third digital-to-analog converter is connected to the second digital-to-analog converter. The first pseudo amplifier includes first and second driving transistors. The second pseudo amplifier includes third and fourth driving transistors. The main amplifier is connected to the first and second pseudo amplifiers, and is configured to generate a reference current. The second resistor string is connected between first and second nodes, and a first output node disposed between the first and second driving transistors is connected to the first node. A second output node disposed between the third and fourth driving transistors is connected to the second node.

In an embodiment, the main amplifier may include a first main amplifier including a fifth driving transistor and a sixth driving transistor and a second main amplifier including a seventh driving transistor and an eighth driving transistor.

In an embodiment, a gate terminal of the fifth driving transistor may be connected to a gate terminal of the first driving transistor, and a gate terminal of the sixth driving transistor may be connected to a gate terminal of the second driving transistor.

In an embodiment, the first main amplifier may further include a first class AB controller configured to provide a gate voltage to the gate terminal of each of the fifth and sixth driving transistors.

In an embodiment, the first class AB controller may be configured to detect a current of the first node, and maintain a current value of the first node to the reference current by adjusting the gate voltage provided to the gate terminal of each of the fifth and sixth driving transistors according to the current value of the first node.

In an embodiment, a gate terminal of the seventh driving transistor may be connected to a gate terminal of the third driving transistor, and a gate terminal of the eighth driving transistor may be connected to a gate terminal of the fourth driving transistor.

In an embodiment, the second main amplifier may further include a second class AB controller configured to provide a gate voltage to the gate terminal of each of the seventh and eighth driving transistors.

In an embodiment, the second class AB controller may be configured to detect a current of the second node, and may maintain a current value of the second node to the reference current by adjusting the gate voltage provided to the gate terminal of each of the seventh and eighth driving transistors according to the current value of the second node.

In an embodiment, the main amplifier may further include a third resistor string including third resistors, and may be connected to an output terminal of the first main amplifier and an output terminal of the second main amplifier. The reference current may flow through the third resistor string.

In an embodiment, the first main amplifier may further include a first class AB controller configured to provide a gate voltage to a gate terminal of each of the fifth and sixth driving transistors. The first class AB controller may be configured to perform detection to maintain the reference current flowing through the third resistor string, and may provide the reference current to the first node. The second main amplifier may further include a second class AB controller configured to provide a gate voltage to a gate terminal of each of the seventh and eighth driving transistors. The second class AB controller may be configured to perform detection to maintain the reference current flowing through the third resistor string, and may provide the reference current to the second node.

In an embodiment, each of the fifth and seventh driving transistors may include a P-type driving transistor, and each of the sixth and eighth driving transistors may include an N-type driving transistor.

In an embodiment, a configuration of the fifth and sixth driving transistors included in the first main amplifier may be identical to a configuration of the first and second driving transistors included in the first pseudo amplifier.

In an embodiment, a configuration of the seventh and eighth driving transistors included in the second main amplifier may be identical to a configuration of the third and fourth driving transistors included in the second pseudo amplifier.

In an embodiment, the main amplifier may include a class AB amplifier.

In an embodiment, a size of each of the fifth to eighth driving transistors may be different from a size of each of the first to fourth driving transistors.

In an embodiment, a magnitude of a current used in each of the fifth to eighth driving transistors may be greater than a magnitude of a current flowing through each of the first to fourth driving transistors.

In an embodiment, each of the first and third driving transistors may include a P-type driving transistor, and each of the second and fourth driving transistors may include an N-type driving transistor.

In an embodiment, the data driver may further include a first control voltage driver for connecting the main amplifier to the first pseudo amplifier and a second control voltage driver for connecting the main amplifier to the second pseudo amplifier.

In an embodiment, each of the first and second control voltage drivers may include a first channel, a second channel, and a mux, and may be configured to alternately operate through the first and second channels to output a gate voltage without an offset.

According to an embodiment of the present disclosure, a display device includes a display panel and a data driver. The display panel includes a plurality of pixels. The data driver includes a first digital-to-analog converter, a second digital-to-analog converter, a third digital-to-analog converter, a first pseudo amplifier, a second pseudo amplifier, and a main amplifier. The first digital-to-analog converter includes a first resistor string including first resistors and a first decoder. The second digital-to-analog converter includes a second resistor string including second resistors and a second decoder, and is connected to the first digital-to-analog converter. The third digital-to-analog converter is connected to the second digital-to-analog converter. The first pseudo amplifier includes first and second driving transistors. The second pseudo amplifier includes third and fourth driving transistors. The main amplifier is connected to the first and second pseudo amplifiers, and is configured to generate a reference current. The second resistor string is connected between first and second nodes, and a first output node disposed between the first and second driving transistors is connected to the first node. A second output node disposed between the third and fourth driving transistors is connected to the second node.

According to the display device of the embodiments of the present disclosure, the current that is equal to the reference current generated by the main amplifier may be provided to the second resistor string of the second digital-to-analog converter through the first node and the second node. Since the second digital-to-analog converter is receiving a sufficient current from the pseudo amplifier, the second digital-to-analog converter may not receive a current from the first digital-to-analog converter. Accordingly, while the second digital-to-analog converter is connected to the first digital-to-analog converter, the current path of the second digital-to-analog converter may be separated from the first digital-to-analog converter by the pseudo amplifier. In other words, the display device includes the pseudo amplifier, so that the load effect in which the first resistor string of the first digital-to-analog converter and the second resistor string of the second digital-to-analog converter are connected to each other may not occur.

BRIEF DESCRIPTION OF THE DRAWINGS

Embodiments can be understood in more detail from the following description taken in conjunction with the accompanying drawings.

DETAILED DESCRIPTION OF THE EMBODIMENTS

Figure 1:
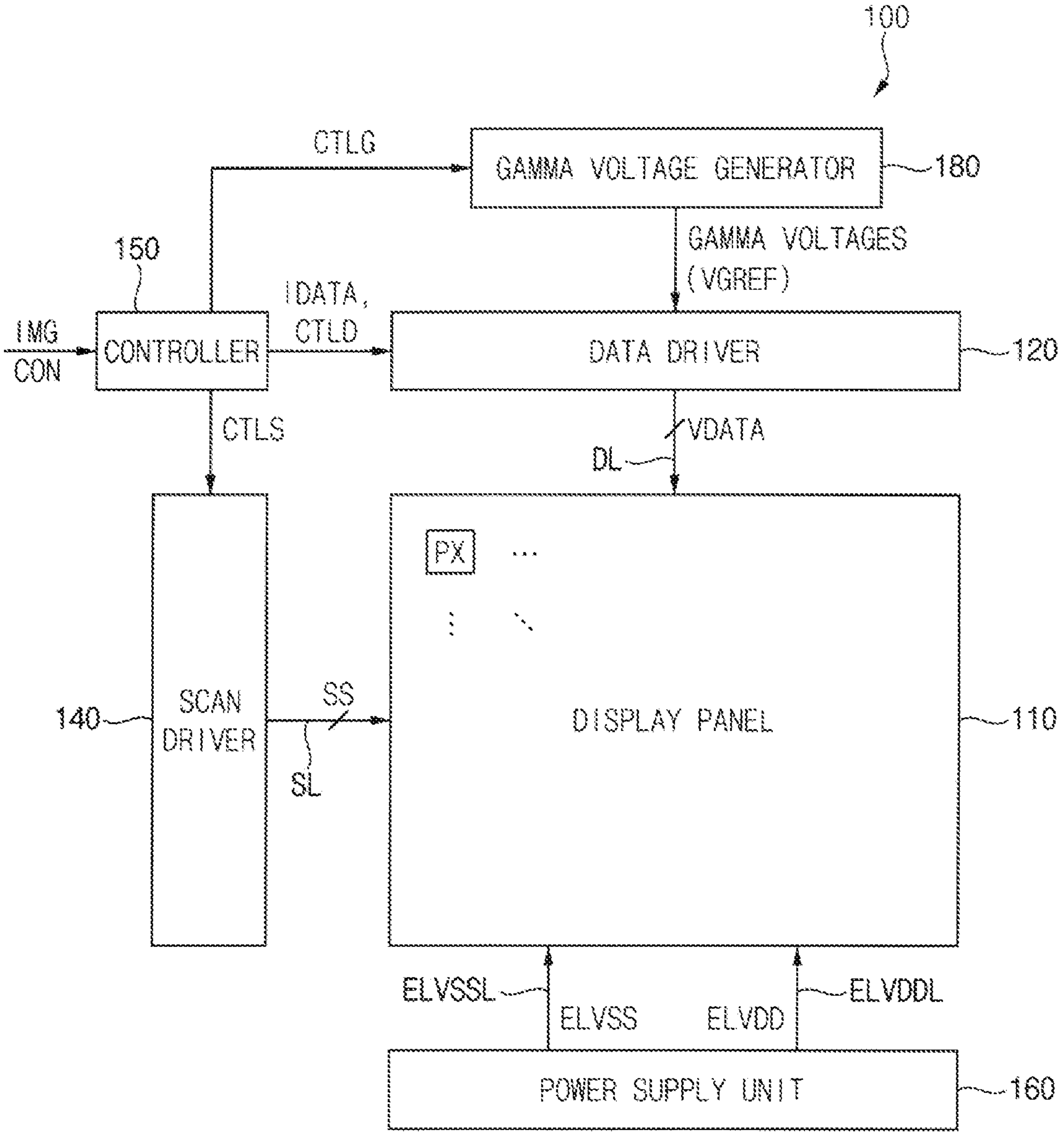
FIG. 1 is a block diagram showing a display device according to embodiments of the present disclosure.

Hereinafter, display devices including a data driver according to embodiments of the present disclosure will be described in detail with reference to the accompanying drawings. In the accompanying drawings, same or similar reference numerals refer to the same or similar elements.

FIG. 1 is a block diagram showing a display device according to embodiments of the present disclosure.

Referring to FIG. 1, a display device 100 may include a display panel 110 including a plurality of pixels PX, a controller 150, a gamma reference voltage generator 180, a data driver 120, a scan driver 140, a power supply unit 160, and the like.

The display panel 110 may include a plurality of data lines DL, a plurality of scan lines SL, a plurality of first power supply voltage lines ELVDDL, a plurality of second power supply voltage lines ELVSSL, and the plurality of pixels PX connected to the lines. According to embodiments, each of the pixels PX may include at least two transistors, at least one capacitor, and a light emitting element, and the display panel 110 may be a light emitting display panel. According to other embodiments, the display panel 110 may include a display panel of a quantum dot display device (QDD), a display panel of a liquid crystal display device (LCD), a display panel of a field emission display device (FED), a display panel of a plasma display device (PDP), or a display panel of an electrophoretic display device (EPD).

The controller 150 (e.g., a timing controller (T-CON)) may receive image data IMG and an input control signal CON from an external host processor (e.g., an application processor (AP), a graphic processing unit (GPU), or a graphic card). The image data IMG may be RGB image data including red image data, green image data, and blue image data. The control signal CON may include a vertical synchronization signal, a horizontal synchronization signal, an input data enable signal, a master clock signal, and the like, but the embodiments are not limited thereto.

The controller 150 may convert the image data IMG into input image data IDATA by applying an algorithm (e.g., dynamic capacitance compensation (DCC), etc.) for correcting image quality to the image data IMG supplied from the external host processor. In some embodiments, when the controller 150 does not include an algorithm for improving image quality, the image data IMG may be output as the input image data IDATA. The controller 150 may supply the input image data IDATA to the data driver 120.

The controller 150 may generate a data control signal CTLD for controlling driving of the input image data IDATA and a scan control signal CTLS based on the input control signal CON. For example, the scan control signal CTLS may include a vertical start signal, scan clock signals, and the like, and the data control signal CTLD may include a horizontal start signal, a data clock signal, and the like.

The controller 150 may generate a gamma control signal CTLG for controlling an operation of the gamma reference voltage generator 180 based on the input control signal CON, and supply the gamma control signal CTLG to the gamma reference voltage generator 180.

The scan driver 140 may generate scan signals SS based on the scan control signal CTLS received from the controller 150. The scan driver 140 may output the scan signals SS to the pixels PX connected to the scan lines SL.

The power supply unit 160 may generate a first power supply voltage ELVDD and a second power supply voltage ELVSS, and provide the first power supply voltage ELVDD and the second power supply voltage ELVSS to the pixels PX through the first power supply voltage line ELVDDL and the second power supply voltage line ELVSSL.

The gamma reference voltage generator 180 may generate a gamma reference voltage VGREF based on the gamma control signal CTLG received from the controller 150. The gamma reference voltage generator 180 may provide the gamma reference voltage VGREF to the data driver 120. The gamma reference voltage VGREF provided to the data driver 120 may have a value corresponding to each input image data IDATA. In some embodiments, the gamma reference voltage generator 180 may be formed integrally with the data driver 120 or the controller 150.

The data driver 120 may receive the data control signal CTLD and the input image data IDATA from the controller 150, and receive the gamma reference voltage VGREF from the gamma reference voltage generator 180. The data driver 120 may convert digital input image data IDATA into an analog data voltage by using the gamma reference voltage VGREF. In this case, the analog data voltage obtained by the conversion will be defined as a data voltage VDATA. The data driver 120 may output data voltages VDATA to the pixels PX connected to the data lines DL based on the data control signal CTLD. According to other embodiments, the data driver 120 and the controller 150 may be implemented as a single integrated circuit, and such an integrated circuit may be referred to as a timing controller-embedded data driver (TED).

Figure 2:
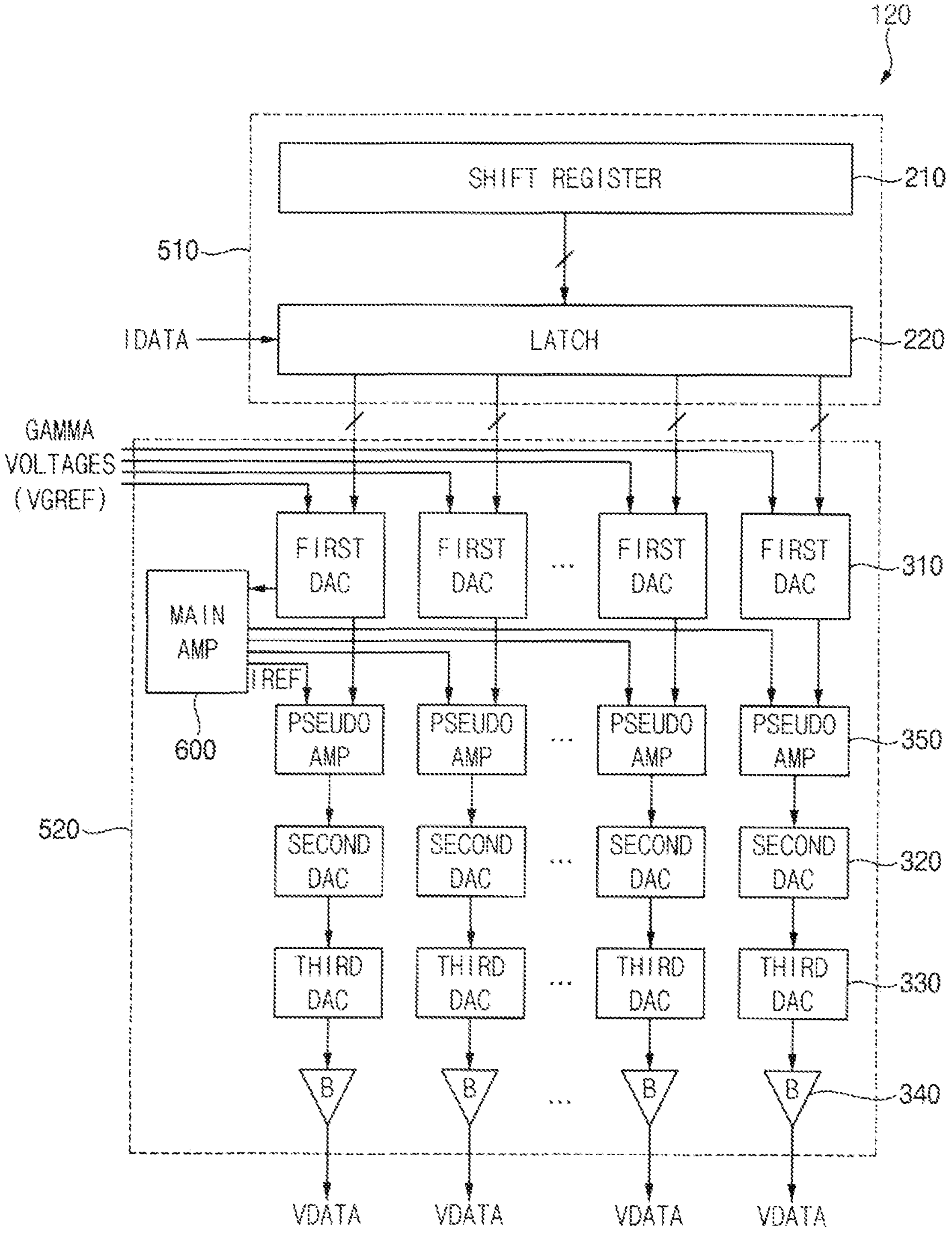
FIG. 2 is a block diagram showing a data driver included in FIG. 1.

FIG. 2 is a block diagram showing a data driver included in FIG. 1.

Referring to FIG. 2, the data driver 120 may include a digital driver 510 and an analog driver 520. In this case, the digital driver 510 may include a shift register 210, a latch 220, and the like, and the analog driver 520 may include a main amplifier 600, first digital-to-analog converters 310, a pseudo amplifier 350, second digital-to-analog converters 320, third digital-to-analog converters 330, buffers 340, and the like.

The shift register 210 may sequentially shift the input image data IDATA.

The latch 220 may receive and temporarily store the input image data IDATA. In some embodiments, the latch 220 may include a sampling latch and a holding latch.

According to other embodiments, the digital driver 510 may further include a level shifter configured to shift (e.g., increase) a level of the input image data IDATA.

The main amplifier 600, the first digital-to-analog converter 310, the pseudo amplifier 350, the second digital-to-analog converter 320, and the third digital-to-analog converter 330 may convert the digital input image data IDATA into the analog data voltage VDATA based on the gamma reference voltage VGREF.

The first digital-to-analog converter 310 may receive the gamma reference voltage VGREF and the input image data IDATA. The first digital-to-analog converter 310 may include a first resistor string including a plurality of resistors, and a first decoder. In other words, the first digital-to-analog converter 310 may be a resistance string digital-to-analog converter. According to the embodiments, the first resistor string may be used globally. In other words, the first resistor string may be commonly used in the first digital-to-analog converters 310, and the first resistor string may be connected to a plurality of decoders.

The main amplifier 600 may be connected to the first resistor string of the first digital-to-analog converter 310, may receive preset first and second voltages from the first resistor string, and may generate a reference current IREF based on the preset first and second voltages. The main amplifier 600 may be connected to each of pseudo amplifiers 350. According to the embodiments, the main amplifier 600 may be a class AB amplifier.

The pseudo amplifier 350 may be connected to the main amplifier 600, the first digital-to-analog converter 310, and the second digital-to-analog converter 320. The pseudo amplifier 350 may provide a current that is equal to the reference current IREF generated by the main amplifier 600 to the second digital-to-analog converter 320.

The second digital-to-analog converter 320 may include a second resistor string including a plurality of resistors, and a second decoder. In other words, the second digital-to-analog converter 320 may be a resistance string digital-to-analog converter. The second digital-to-analog converter 320 may be connected to the first digital-to-analog converter 310, the pseudo amplifier 350, and the third digital-to-analog converter 330. The second digital-to-analog converter 320 may receive first and second coarse voltages selected from the first digital-to-analog converter 310. In addition, the current that is equal to the reference current IREF may flow through the second resistor string of the second digital-to-analog converter 320 through the pseudo amplifier 350. In other words, while the second digital-to-analog converter 320 may receive the first and second coarse voltages from the first digital-to-analog converter 310, the second digital-to-analog converter 320 may receive a current through the pseudo amplifier 350 instead of receiving a current from the first digital-to-analog converter 310. Accordingly, while the second digital-to-analog converter 320 is connected to the first digital-to-analog converter 310, a current path of the second digital-to-analog converter 320 may be separated from the first digital-to-analog converter 310 by the pseudo amplifier 350. According to the embodiments, the display device 100 includes the pseudo amplifier 350, so that a load effect in which the first resistor string of the first digital-to-analog converter 310 and the second resistor string of the second digital-to-analog converter 320 are connected to each other may not occur.

The third digital-to-analog converter 330 may be connected to the second digital-to-analog converter 320 and the buffer 340. The third digital-to-analog converter 330 may receive third and fourth coarse voltages selected from the second digital-to-analog converter 320, and generate a final output data voltage. The output data voltage may be the data voltage VDATA. The third digital-to-analog converter 330 may provide the data voltage VDATA to the buffer 340. According to the embodiments, the third digital-to-analog converter 330 may be an interpolation digital-to-analog converter implemented by an embedded amplifier scheme.

The buffer 340 may receive the data voltage VDATA from the third digital-to-analog converter 330, and output the data voltage VDATA to the data line DL. The buffers 340 may be connected in a one-to-one correspondence with the data lines DL. In other words, a number of the buffers 340 may match a number of the data lines DL. In addition, each of a number of the first digital-to-analog converters 310, a number of the pseudo amplifiers 350, a number of the second digital-to-analog converters 320, and a number of the third digital-to-analog converters 330 may also match the number of the data lines DL. According to the embodiments, a number of main amplifiers 600 may be one.

Figure 3:
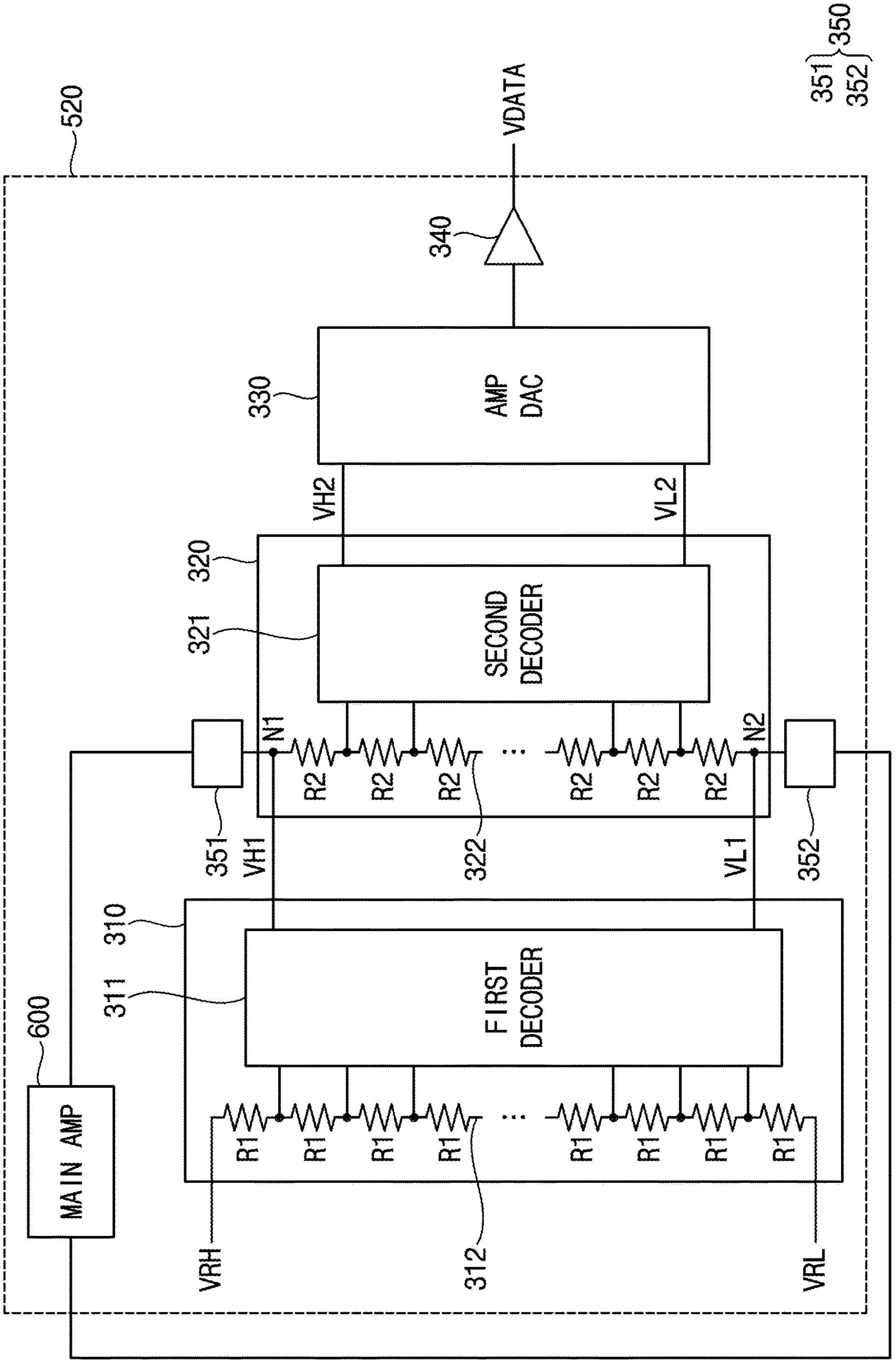
FIG. 3 is a view showing an analog driver of FIG. 2.
Figure 4:
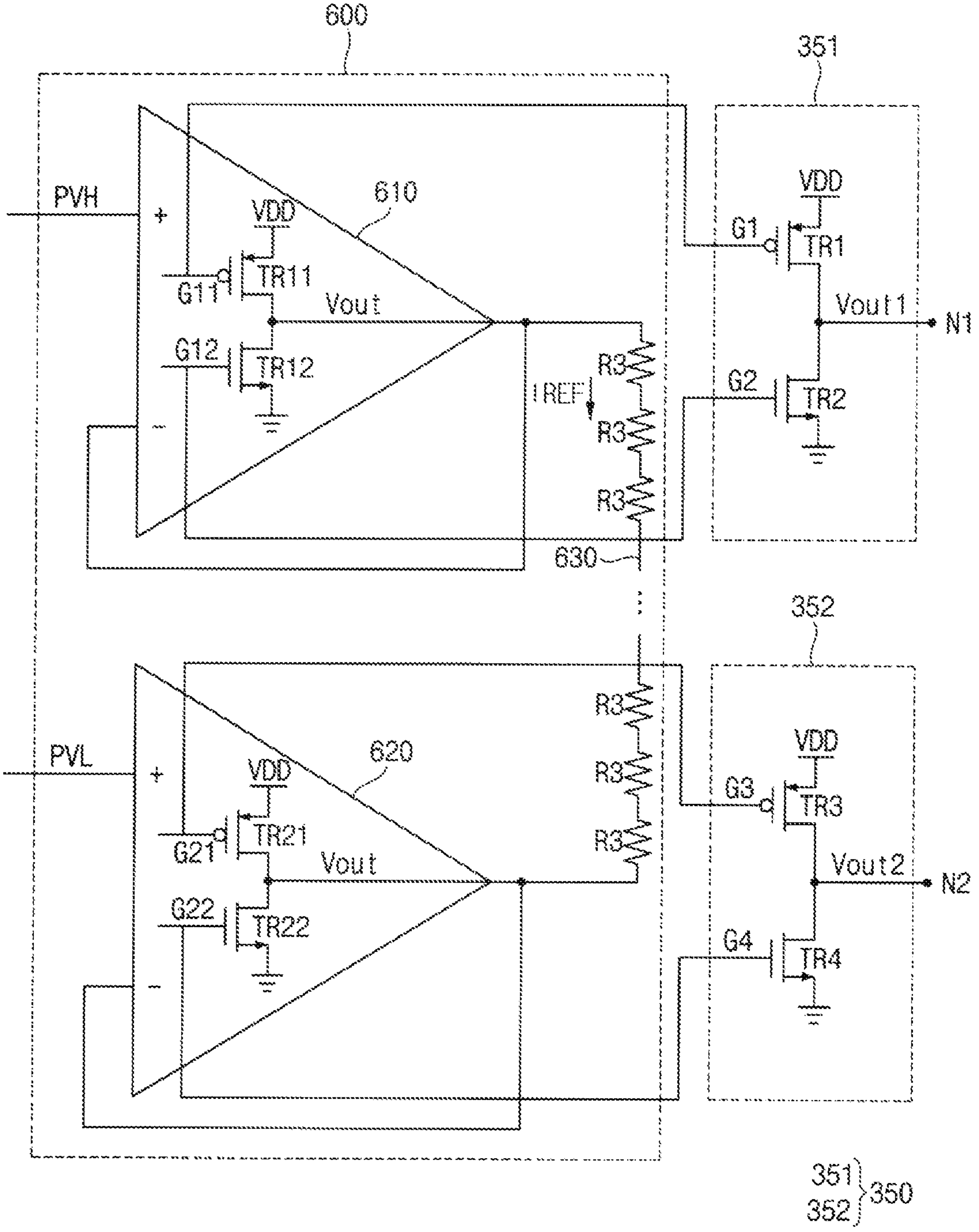
FIG. 4 is a circuit diagram showing a main amplifier and a pseudo amplifier of FIG. 3.
Figure 5:
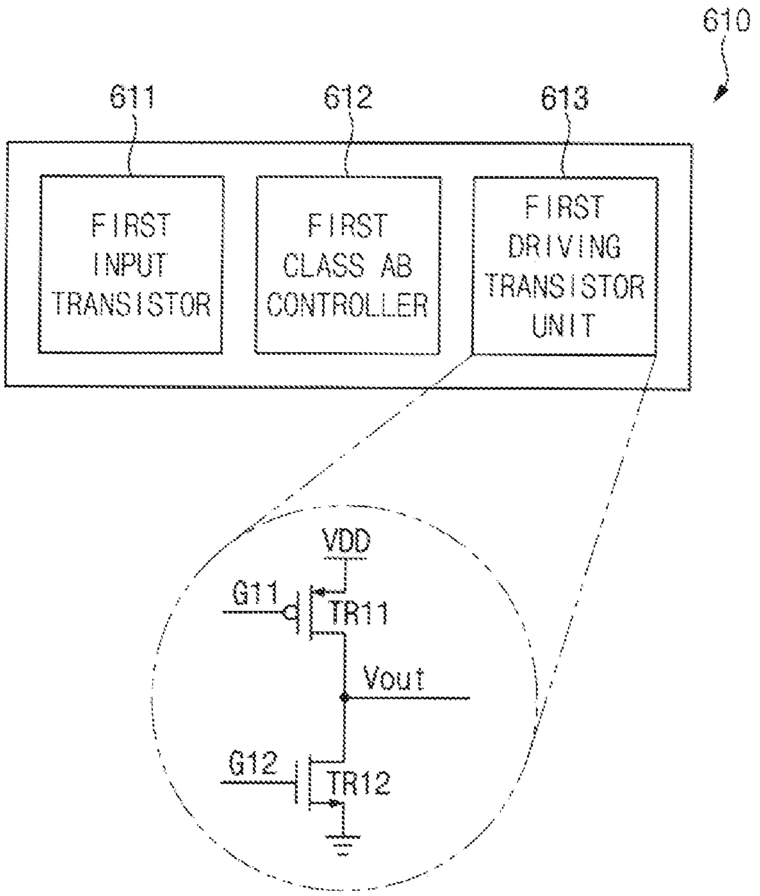
FIG. 5 is a view for describing a first main amplifier of FIG. 4.
Figure 6:
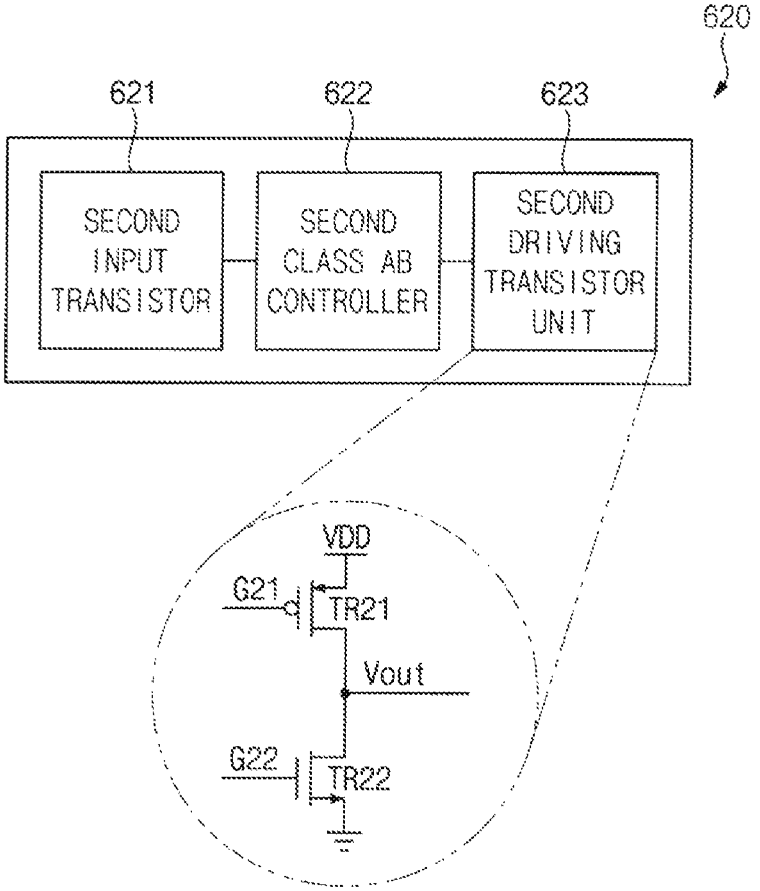
FIG. 6 is a view for describing a second main amplifier of FIG. 4.

FIG. 3 is a view showing an analog driver of FIG. 2, FIG. 4 is a circuit diagram showing a main amplifier and a pseudo amplifier of FIG. 3, FIG. 5 is a view for describing a first main amplifier of FIG. 4, and FIG. 6 is a view for describing a second main amplifier of FIG. 4.

Referring to FIGS. 3, 4, 5, and 6, the analog driver 520 may include a first digital-to-analog converter 310, a second digital-to-analog converter 320, a third digital-to-analog converter 330, a buffer 340, a pseudo amplifier 350, a main amplifier 600, and the like. In this case, the first digital-to-analog converter 310 may include a first resistor string 312 including first resistors R1 and a first decoder 311, and the second digital-to-analog converter 320 may include a second resistor string 322 including second resistors R2 and a second decoder 321. In addition, the main amplifier 600 may include a first main amplifier 610, a second main amplifier 620, and a third resistor string 630 including third resistors R3, and the pseudo amplifier 350 may include a first pseudo amplifier 351 and a second pseudo amplifier 352. Furthermore, the first pseudo amplifier 351 may include a first driving transistor TR1 and a second driving transistor TR2, and the second pseudo amplifier 352 may include a third driving transistor TR3 and a fourth driving transistor TR4. Meanwhile, the first main amplifier 610 may include a first input transistor 611, a first class AB controller 612, and a first driving transistor unit 613, and the first driving transistor unit 613 may include a fifth driving transistor TR11 and a sixth driving transistor TR12. In addition, the second main amplifier 620 may include a second input transistor 621, a second class AB controller 622, and a second driving transistor unit 623, and the second driving transistor unit 623 may include a seventh driving transistor TR21 and an eighth driving transistor TR22.

The analog driver 520 may include digital-to-analog converters configured in three stages. The digital-to-analog converters configured in the three stages may implement an (X+Y+Z)-bit digital-to-analog converter. According to the embodiments, the analog driver 520 may include a 12-bit digital-to-analog converter. For example, the analog driver 520 may include a 6-bit first digital-to-analog converter 310, a 4-bit second digital-to-analog converter 320, and a 2-bit third digital-to-analog converter 330.

In this case, when the first digital-to-analog converter 310 and the second digital-to-analog converter 320 are directly connected to each other, voltage division of the first resistor string 312 of the first digital-to-analog converter 310 may be distorted by the second resistor string 322 of the second digital-to-analog converter 320, which may be referred to as a load effect. According to the embodiments, the analog driver 520 includes the pseudo amplifier 350, so that the load effect may not occur between the first digital-to-analog converter 310 and the second digital-to-analog converter 320. Meanwhile, since the third digital-to-analog converter 330 includes an interpolation digital-to-analog converter implemented by an embedded amplifier scheme, the load effect may not occur even when the second digital-to-analog converter 320 and the third digital-to-analog converter 330 are directly connected to each other.

When the first digital-to-analog converter 310 is an X-bit digital-to-analog converter, the second digital-to-analog converter 320 is a Y-bit digital-to-analog converter, and the third digital-to-analog converter 330 is a Z-bit digital-to-analog converter, the first digital-to-analog converter 310 may select the first and second coarse voltages VH1 and VL1, which are two adjacent voltages among $2^X$ voltages. In addition, the second digital-to-analog converter 320 and the third digital-to-analog converter 330 may select one of $2^{(Y+Z)}$ voltages between the first and second coarse voltages VH1 and VL1. In detail, the second digital-to-analog converter 320 may select the third and fourth coarse voltages VH2 and VL2, which are two adjacent voltages among $2^Y$ voltages between the first and second coarse voltages VH1 and VL1, and the third digital-to-analog converter 330 may select one of $2^Z$ voltages between the third and fourth coarse voltages VH2 and VL2.

When the analog driver 520 is the 12-bit digital-to-analog converter, and the analog driver 520 includes the 6-bit first digital-to-analog converter 310, the 4-bit second digital-to-analog converter 320, and the 2-bit third digital-to-analog converter 330, the first digital-to-analog converter 310 may include 32 first resistors R1, the second digital-to-analog converter 320 may include 16 second resistors R2, and the third digital-to-analog converter 330 may include amplifiers capable of implementing 2 bits. However, in some embodiments, a number of bits supported by the analog driver 520 and a number of bits supported by each of the first to third digital-to-analog converters 310, 320, and 330 may be variously changed.

The gamma reference voltage VGREF may be input to the first digital-to-analog converter 310, a first gamma reference voltage VRH may be input to an input terminal of the first resistor string 312 based on the gamma reference voltage VGREF, and a second gamma reference voltage VRL may be input to an output terminal of the first resistor string 312 based on the gamma reference voltage VGREF. According to the embodiments, the first resistors R1 may be connected in series to form the first resistor string 312, and a voltage level of the first gamma reference voltage VRH may be relatively greater than a voltage level of the second gamma reference voltage VRL.

The first and second coarse voltages VH1 and VL1 may be input to the second digital-to-analog converter 320. For example, the first coarse voltage VH1 may be input to an input terminal of the second resistor string 322 (e.g., a first node N1), and the second coarse voltage VL1 may be input to an output terminal of the second resistor string 322 (e.g., a second node N2). According to the embodiments, the second resistors R2 may be connected in series to form the second resistor string 322, and a voltage level of the first coarse voltage VH1 may be relatively greater than a voltage level of the second coarse voltage VL1.

Referring again to FIGS. 4 to 6, a preset first voltage PVH generated through the first resistor string 312 may be input to a positive input terminal of the first main amplifier 610. In other words, the preset first voltage PVH may be output to an output terminal of the first main amplifier 610.

A preset second voltage PVL generated through the first resistor string 312 may be input to a positive input terminal of the second main amplifier 620. In addition, the preset second voltage PVL may be output to an output terminal of the second main amplifier 620.

The preset first voltage PVH may be input to an input terminal of the third resistor string 630, and the preset second voltage PVL may be input to an output terminal of the third resistor string 630. According to the embodiments, the third resistors R3 may be connected in series to form the third resistor string 630, and a voltage level of the preset first voltage PVH may be relatively greater than a voltage level of the preset second voltage PVL. In other words, the reference current IREF may flow through the third resistor string 630. In this case, an absolute value of a voltage difference between the preset first and second voltages PVH and PVL may be different from an absolute value of a voltage difference between the first and second coarse voltages VH1 and VL1.

As shown in FIGS. 4 and 5, the preset first voltage PVH generated through the first resistor string 312 may be input to the positive input terminal of the first main amplifier 610. A negative input terminal of the first main amplifier 610 may be connected to the output terminal of the first main amplifier 610. The output terminal of the first main amplifier 610 may be connected to the input terminal of the third resistor string 630.

The first input transistor 611 and the first class AB controller 612 may be connected to the first driving transistor unit 613, and the first class AB controller 612 may provide a gate signal to a gate terminal G11 of the fifth driving transistor TR11 and a gate terminal G12 of the sixth driving transistor TR12 included in the first driving transistor unit 613.

A source terminal of the fifth driving transistor TR11 may be connected to a power supply terminal VDD, a drain terminal of the fifth driving transistor TR11 may be connected to a drain terminal of the sixth driving transistor TR12, and a source terminal of the sixth driving transistor TR12 may be connected to a ground terminal.

Similarly, according to the first pseudo amplifier 351, a source terminal of the first driving transistor TR1 may be connected to the power supply terminal VDD, a drain terminal of the first driving transistor TR1 may be connected to a drain terminal of the second driving transistor TR2, and a source terminal of the second driving transistor TR2 may be connected to the ground terminal. In this case, a node to which the first driving transistor TR1 and the second driving transistor TR2 are connected will be defined as a first output node N3. The first output node N3 may be connected to the first node N1.

The gate terminal G11 of the fifth driving transistor TR11 may be connected to a gate terminal G1 of the first driving transistor TR1 included in the first pseudo amplifier 351, and the gate terminal G12 of the sixth driving transistor TR12 may be connected to a gate terminal G2 of the second driving transistor TR2 included in the first pseudo amplifier 351.

According to the embodiments, a circuit configuration of the first pseudo amplifier 351 may be substantially the same as a circuit configuration of the first driving transistor unit 613 of the first main amplifier 610. For example, the first driving transistor unit 613 may be configured such that the fifth driving transistor TR11 that is a P-type driving transistor (or a P-type output transistor) and the sixth driving transistor TR12 that is an N-type driving transistor (or an N-type output transistor) are connected in series, and the first pseudo amplifier 351 may be configured such that the first driving transistor TR1 that is a P-type driving transistor and the second driving transistor TR2 that is an N-type driving transistor are connected in series. In addition, since the gate terminal G11 of the fifth driving transistor TR11 is connected to the gate terminal G1 of the first driving transistor TR1, and the gate terminal G12 of the sixth driving transistor TR12 is connected to the gate terminal G2 of the second driving transistor TR2, the fifth and sixth driving transistors TR11 and TR12 and the first and second driving transistors TR1 and TR2 may be driven identically.

According to the embodiments, the first class AB controller 612 may perform detection to maintain the reference current IREF flowing through the third resistor string 630, and provide the reference current IREF to the first node N1. In addition, the first class AB controller 612 may detect a current of the first node N1, and maintain a current value of the first node N1 to the reference current IREF by adjusting a gate signal (or a gate voltage) provided to the gate terminal G11 of the fifth driving transistor TR11 and a gate signal provided to the gate terminal G12 of the sixth driving transistor TR12 according to the current value of the first node N1. In other words, the current value of the first node N1 may be changed by noise generated when the data driver 120 is driven (e.g., when a level of a voltage applied to the power supply terminal VDD by a driving load cap is greatly changed), and the first class AB controller 612 may detect a changed current of the first node N1 to adjust the gate signal provided to the gate terminal G11 of the fifth driving transistor TR11 and the gate signal provided to the gate terminal G12 of the sixth driving transistor TR12 according to the changed current value of the first node N1. Accordingly, the first class AB controller 612 may maintain the current value of the first node N1 to the reference current IREF.

As shown in FIGS. 4 and 6, the second preset voltage PVL generated through the first resistor string 312 may be input to the positive input terminal of the second main amplifier 620. A negative input terminal of the second main amplifier 620 may be connected to the output terminal of the second main amplifier 620. The output terminal of the second main amplifier 620 may be connected to the output terminal of the third resistor string 630.

The second input transistor 621 and the second class AB controller 622 may be connected to the second driving transistor unit 623, and the second class AB controller 622 may provide a gate signal to a gate terminal G21 of the seventh driving transistor TR21 and a gate terminal G22 of the eighth driving transistor TR22 included in the second driving transistor unit 623.

A source terminal of the seventh driving transistor TR21 may be connected to the power supply terminal VDD, a drain terminal of the seventh driving transistor TR21 may be connected to a drain terminal of the eighth driving transistor TR22, and a source terminal of the eighth driving transistor TR22 may be connected to the ground terminal.

Similarly, according to the second pseudo amplifier 352, a source terminal of the third driving transistor TR3 may be connected to the power supply terminal VDD, a drain terminal of the third driving transistor TR3 may be connected to a drain terminal of the fourth driving transistor TR4, and a source terminal of the fourth driving transistor TR4 may be connected to the ground terminal. In this case, a node to which the third driving transistor TR3 and the fourth driving transistor TR4 are connected will be defined as a second output node N4. The second output node N4 may be connected to the second node N2.

The gate terminal G21 of the seventh driving transistor TR21 may be connected to a gate terminal G3 of the third driving transistor TR3 included in the second pseudo amplifier 352, and the gate terminal G22 of the eighth driving transistor TR22 may be connected to a gate terminal G4 of the fourth driving transistor TR4 included in the second pseudo amplifier 352.

According to the embodiments, a circuit configuration of the second pseudo amplifier 352 may be substantially the same as a circuit configuration of the second driving transistor unit 623 of the second main amplifier 620. For example, the second driving transistor unit 623 may be configured such that the seventh driving transistor TR21 that is a P-type driving transistor and the eighth driving transistor TR22 that is an N-type driving transistor are connected in series, and the second pseudo amplifier 352 may be configured such that the third driving transistor TR3 that is a P-type driving transistor and the fourth driving transistor TR4 that is an N-type driving transistor are connected in series. In addition, since the gate terminal G21 of the seventh driving transistor TR21 is connected to the gate terminal G3 of the third driving transistor TR3, and the gate terminal G22 of the eighth driving transistor TR22 is connected to the gate terminal G4 of the fourth driving transistor TR4, the seventh and eighth driving transistors TR21 and TR22 and the third and fourth driving transistors TR3 and TR4 may be driven identically.

According to the embodiments, the second class AB controller 622 may perform detection to maintain the reference current IREF flowing through the third resistor string 630, and provide the reference current IREF to the second node N2. In addition, the second class AB controller 622 may detect a current of the second node N2, and maintain a current value of the second node N2 to the reference current IREF by adjusting a gate signal provided to the gate terminal G21 of the seventh driving transistor TR21 and a gate signal provided to the gate terminal G22 of the eighth driving transistor TR22 according to the current value of the second node N2. In other words, the current value of the second node N2 may be changed by noise generated when the data driver 120 is driven (e.g., when the level of the voltage applied to the power supply terminal VDD by the driving load cap is greatly changed), and the second class AB controller 622 may detect a changed current of the second node N2 to adjust the gate signal provided to the gate terminal G21 of the seventh driving transistor TR21 and the gate signal provided to the gate terminal G22 of the eighth driving transistor TR22 according to the changed current value of the second node N2. Accordingly, the second class AB controller 622 may maintain the current value of the second node N2 to the reference current IREF.

According to the display device 100 of the embodiments of the present disclosure, the current that is equal to the reference current IREF generated by the main amplifier 600 may be provided to the second resistor string 322 of the second digital-to-analog converter 320 through the first node N1 and the second node N2. Since the second digital-to-analog converter 320 is receiving a sufficient current from the pseudo amplifier 350, the second digital-to-analog converter 320 may not receive a current from the first digital-to-analog converter 310.

Accordingly, while the second digital-to-analog converter 320 is connected to the first digital-to-analog converter 310, the current path of the second digital-to-analog converter 320 may be separated from the first digital-to-analog converter 310 by the pseudo amplifier 350. In other words, the display device 100 includes the pseudo amplifier 350, so that the load effect in which the first resistor string of the first digital-to-analog converter 310 and the second resistor string of the second digital-to-analog converter 320 are connected to each other may not occur.

Figure 7:
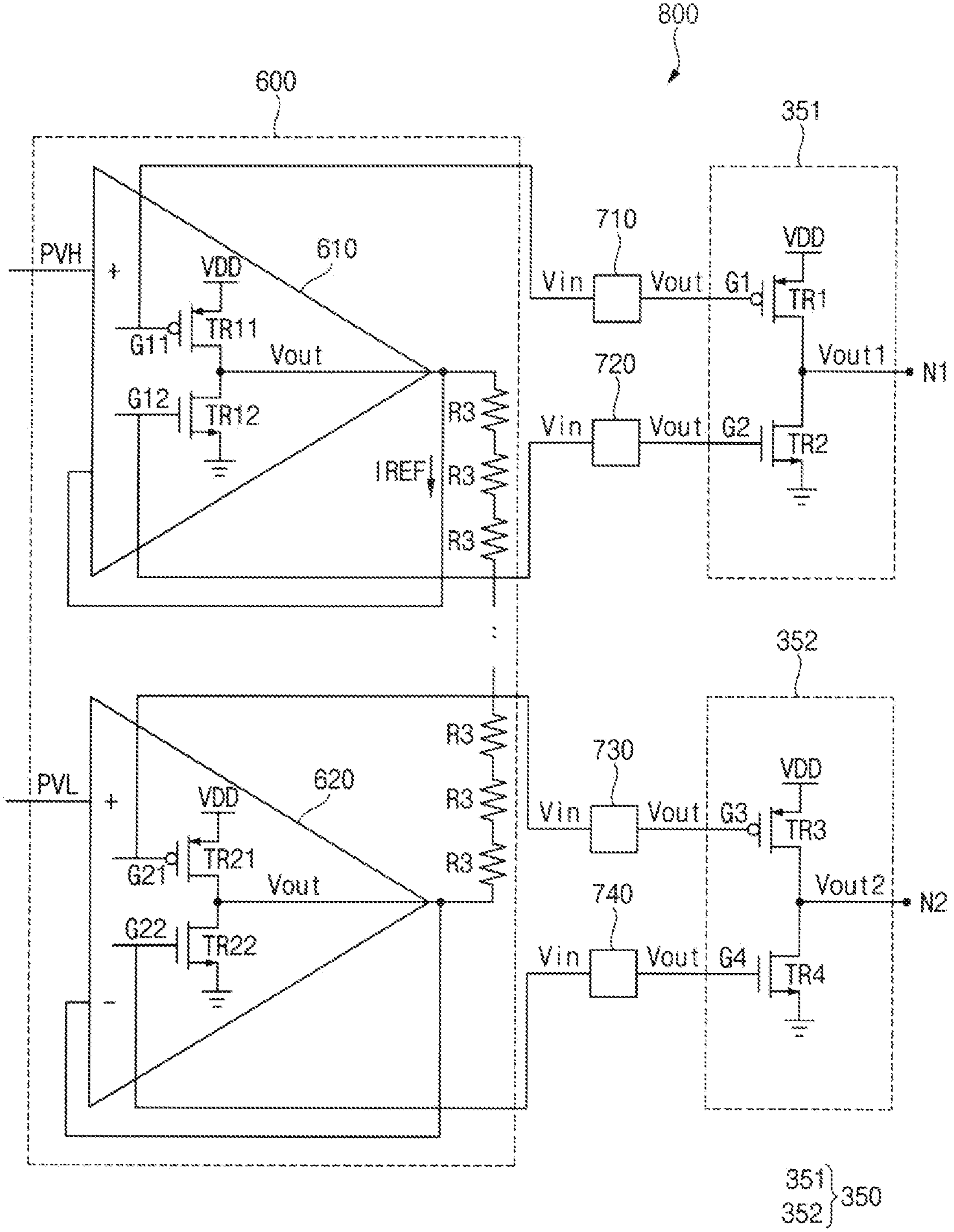
FIG. 7 is a circuit diagram showing a display device according to embodiments of the present disclosure.
Figure 8:
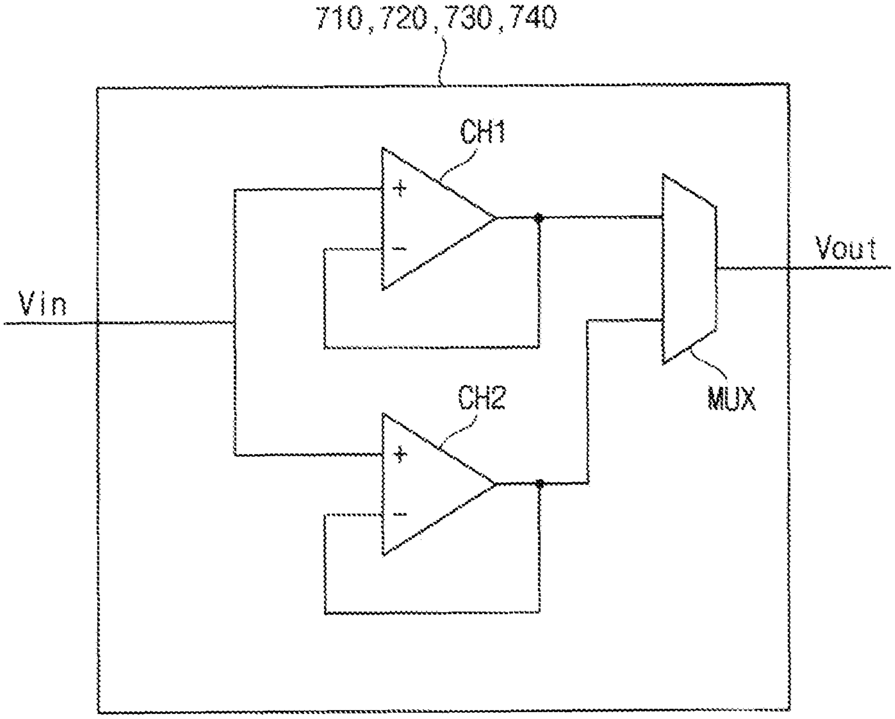
FIG. 8 is a circuit diagram for describing a control voltage driver of FIG. 7.
Figure 9:
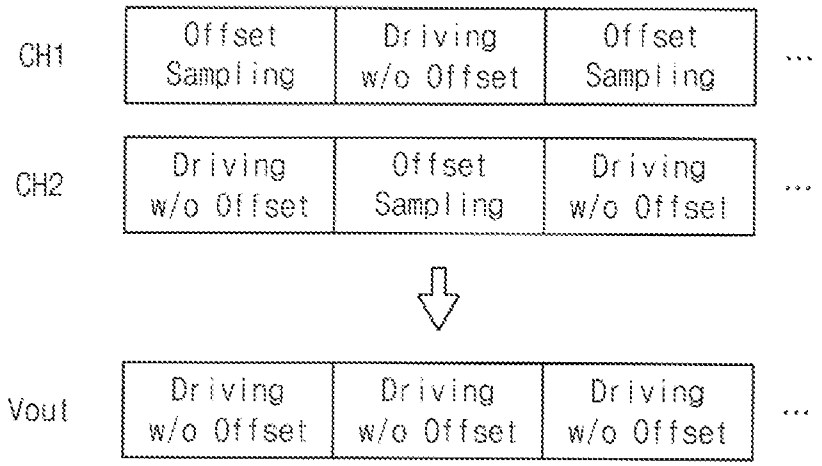
FIG. 9 is a view for describing an operation of the control voltage driver of FIG. 8.

FIG. 7 is a circuit diagram showing a display device according to embodiments of the present disclosure, FIG. 8 is a circuit diagram for describing a control voltage driver of FIG. 7, and FIG. 9 is a view for describing an operation of the control voltage driver of FIG. 8. A display device 800 illustrated in FIGS. 7 to 9 may have a configuration that is substantially identical or similar to the configuration of the display device 100 described with reference to FIGS. 1 to 6 except for first to fourth control voltage drivers 710, 720, 730, and 740. In FIGS. 7 to 9, redundant descriptions of components that are substantially identical or similar to the components described with reference to FIGS. 1 to 6 will be omitted.

Referring to FIGS. 1 and 7 to 9, the display device 800 may include a display panel 110 including a plurality of pixels PX, a controller 150, a gamma reference voltage generator 180, a data driver 120, a scan driver 140, a power supply unit 160, and the like. In this case, the data driver 120 may include a digital driver 510 and an analog driver 520. In addition, the digital driver 510 may include a shift register 210, a latch 220, and the like, and the analog driver 520 may include a main amplifier 600, first digital-to-analog converters 310, a pseudo amplifier 350, second digital-to-analog converters 320, third digital-to-analog converters 330, buffers 340, first to fourth control voltage drivers 710, 720, 730, and 740, and the like.

The first control voltage driver 710 may be connected to a line for connecting the gate terminal G11 of the fifth driving transistor TR11 to the gate terminal G1 of the first driving transistor TR1, and the second control voltage driver 720 may be connected to a line for connecting the gate terminal G12 of the sixth driving transistor TR12 to the gate terminal G2 of the second driving transistor TR2. In addition, the third control voltage driver 730 may be connected to a line for connecting the gate terminal G21 of the seventh driving transistor TR21 to the gate terminal G3 of the third driving transistor TR3, and the fourth control voltage driver 740 may be connected to a line for connecting the gate terminal G22 of the eighth driving transistor TR22 to the gate terminal G4 of the fourth driving transistor TR4.

The first to fourth control voltage drivers 710, 720, 730, and 740 may prevent a channel load driving speed from being decreased. For example, when one main amplifier 600 is connected to a plurality of channels, the channel load driving speed may be decreased. According to the display device 800 of embodiments of the present disclosure, the first to fourth control voltage drivers 710, 720, 730, and 740 are interposed between the main amplifier 600 and the channels, so that a decrease in the channel load driving speed may be improved.

Each of the first to fourth control voltage drivers 710, 720, 730, and 740 may include a first channel CH1, a second channel CH2, and a mux MUX.

A positive input terminal of the first channel CH1 may be connected to a positive input terminal of the second channel CH2, and a negative input terminal of the first channel CH1 may be connected to an output terminal of the first channel CH1. In addition, a negative input terminal of the second channel CH2 may be connected to an output terminal of the second channel CH2, and the output terminal of the first channel CH1 and the output terminal of the second channel CH2 may be connected to the MUX.

For example, the first control voltage driver 710 may receive a gate voltage provided to the gate terminal G11 of the fifth driving transistor TR11. The gate voltage may be input to the positive input terminal of each of the first channel CH1 and the second channel CH2. Signal distortion may be caused by an offset deviation of an amplifier included in the first control voltage driver 710, so that the first control voltage driver 710 may include a dual channel (i.e., the first channel CH1 and the second channel CH2). Accordingly, as shown in FIG. 9, the first control voltage driver 710 may alternately operate, so that the first control voltage driver 710 may be driven without an interval, and may output a gate voltage without an offset.

Figure 10:
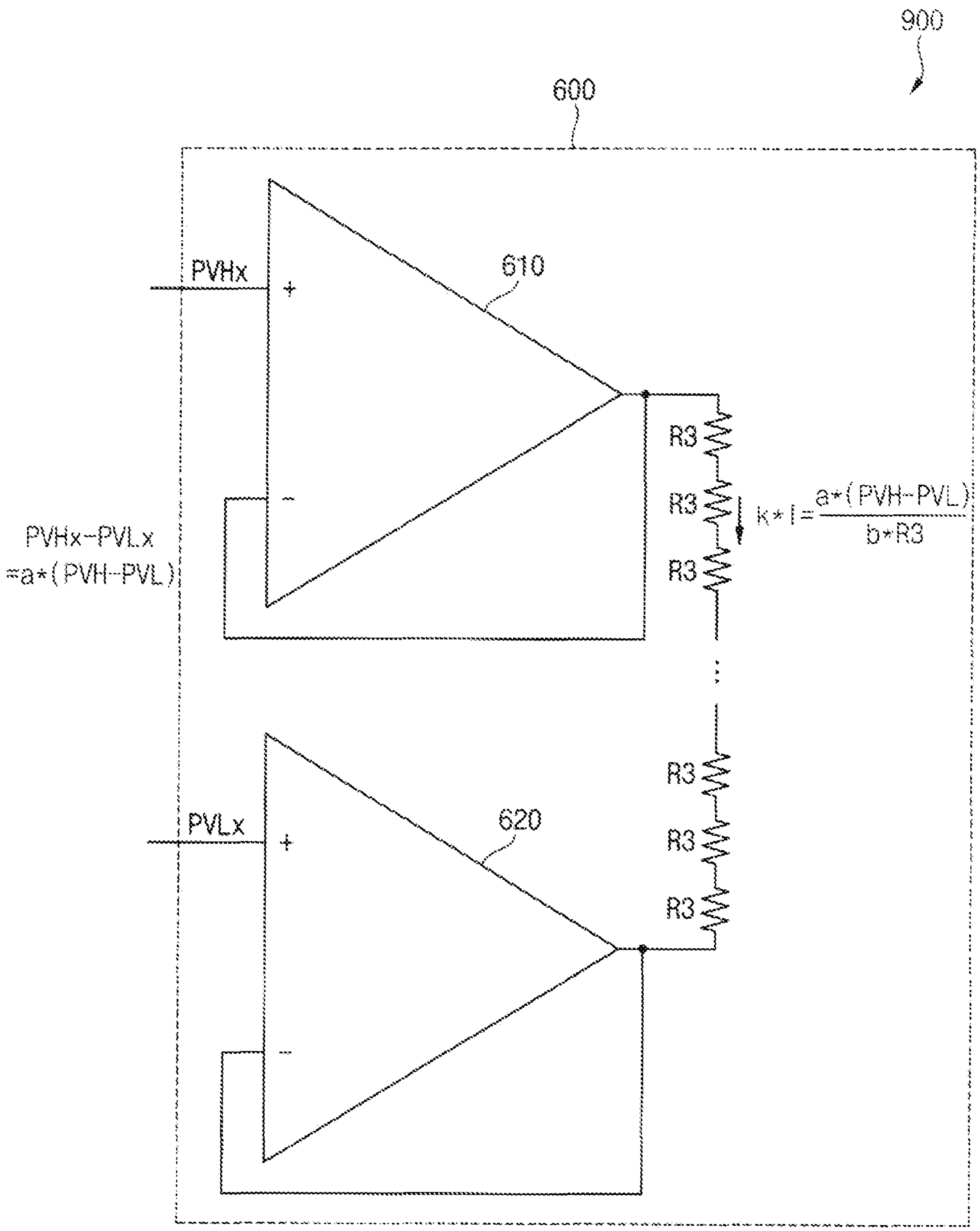
FIG. 10 is a circuit diagram showing a display device according to embodiments of the present disclosure.
Figure 11:
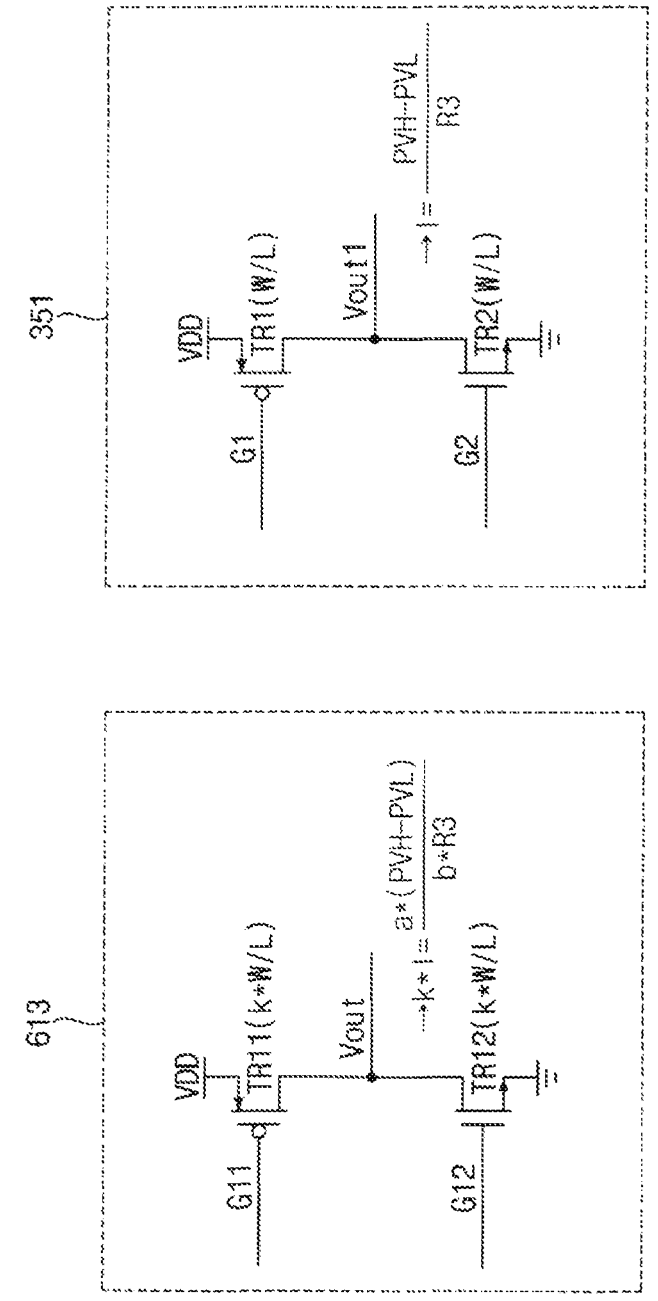
FIG. 11 is a circuit diagram for describing a first main amplifier and a first pseudo amplifier of FIG. 10.

FIG. 10 is a circuit diagram showing a display device according to embodiments of the present disclosure, and FIG. 11 is a circuit diagram for describing a first main amplifier and a first pseudo amplifier of FIG. 10. A display device 900 illustrated in FIGS. 10 and 11 may have a configuration that is substantially identical or similar to the configuration of the display device 100 described with reference to FIGS. 1 to 6. In FIGS. 10 and 11, redundant descriptions of components that are substantially identical or similar to the components described with reference to FIGS. 1 to 6 will be omitted.

Referring to FIGS. 4, 10, and 11, according to the display device 900, a relatively high current may be required for a main amplifier 600 to improve driving capability of the main amplifier 600. Meanwhile, since a relatively low current is sufficient in a channel, a current used in the main amplifier 600 and a current used in the channel (i.e., a pseudo amplifier 350) may be applied so as to be different from each other.

For example, in order to increase the current used in the main amplifier 600, a number of third resistors R3 may be increased by b times, and a voltage difference PVH-PVL across both ends of the third resistors R3 may be increased by a times, so that a reference current that is k times greater may be generated. In addition, first and second voltages PVHx and PVLx may be input to a first main amplifier 610 and a second main amplifier 620, respectively, and a width-to-length W/L of a channel of each of fifth and sixth driving transistors TR11 and TR12 included in the first driving transistor unit 613 may be increased by k times a width-to-length W/L of a channel of each of first and second driving transistors TR1 and TR2 included in the first pseudo amplifier 351. In this case, a magnitude of the current used in the main amplifier 600 may be k times greater than a magnitude of a current used in the first pseudo amplifier 351.

In other words, the number of the third resistors R3 in the main amplifier 600 may be increased, the voltage difference PVH-PVL may be increased, and a ratio of a size of each of the fifth and sixth driving transistors TR11 and TR12 included in the first driving transistor unit 613 and a size of each of the first and second driving transistors TR1 and TR2 included in the first pseudo amplifier 351 may be changed, so that the current used in the main amplifier 600 and the current used in the channel may be applied so as to be different from each other.

Figure 12:
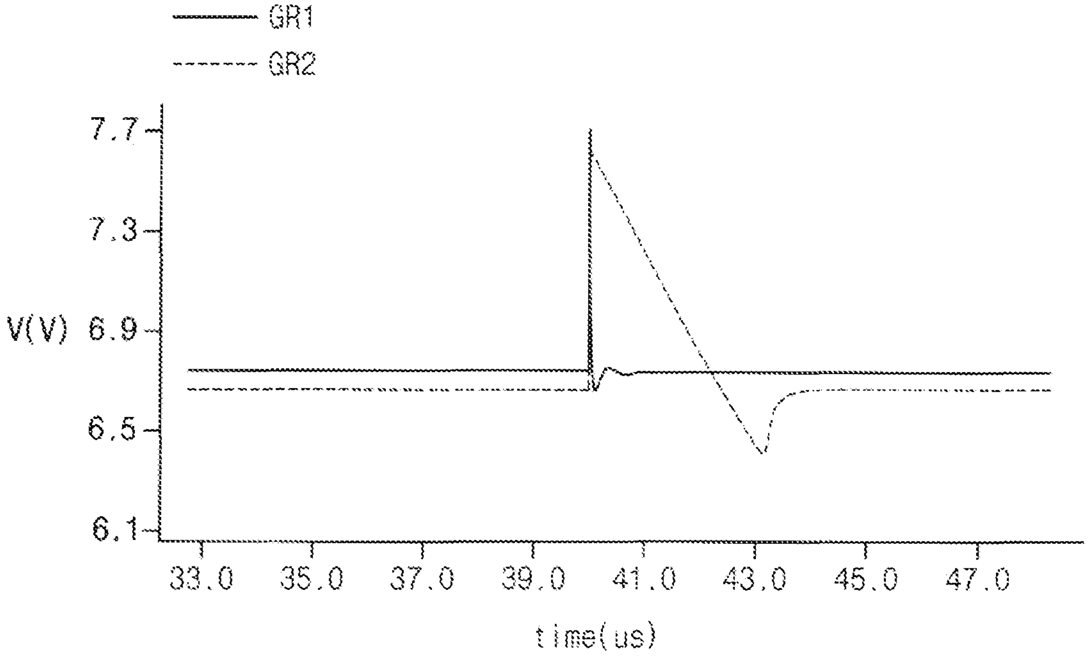
FIG. 12 is a graph showing a variation in a voltage according to a time during charging of a driving load cap according to an embodiment and a variation in a voltage according to a time during charging of a driving load cap according to a comparative example.

FIG. 12 is a graph showing a variation in a voltage according to a time during charging of a driving load cap according to an embodiment and a variation in a voltage according to a time during charging of a driving load cap according to a comparative example. For example, a first graph GR1 may correspond to the embodiment, and a second graph GR2 may correspond to the comparative example.

Referring to FIG. 12, a relatively high driving voltage may be used (e.g., a black gray level) according to a variation in a gray level when a display device is driven, and a voltage level applied to a power supply terminal VDD may be greatly changed by a driving load cap so that a voltage may greatly rise at first and second nodes N1 and N2. The voltage rise may correspond to a peak of each of the first graph GR1 and the second graph GR2.

Since a conventional display device is driven by a fixed current source (e.g., a constant current), stabilization has been performed at a predetermined slope for voltage stabilization during charging of a driving load cap, and a time required for the voltage stabilization may be relatively long due to a parasitic cap generated between adjacent gate lines in a data driver. On the contrary, since a display device of the present disclosure is driven with a dynamic current by first and second class AB controllers 612 and 622, a voltage may be stabilized at a fast rate during charging of the driving load cap.

According to embodiments, the first class AB controller 612 may perform detection to maintain a reference current IREF flowing through a third resistor string 630, and provide a reference current IREF to a first node N1. In addition, the first class AB controller 612 may detect a current of the first node N1, and maintain a current value of the first node N1 to the reference current IREF by adjusting a gate signal provided to a gate terminal G11 of a fifth driving transistor TR11 and a gate signal provided to a gate terminal G12 of a sixth driving transistor TR12 according to the current value of the first node N1. For example, when the current value of the first node N1 is increased by the charging of the driving load cap, the first class AB controller 612 may relatively reduce driving of the fifth driving transistor TR11 and relatively increase driving of the sixth driving transistor TR12 so as to remove a current accumulated in a parasitic cap in a relatively rapid manner. On the contrary, when the current value of the first node N1 is decreased, the first class AB controller 612 may relatively reduce the driving of the sixth driving transistor TR12 and relatively increase the driving of the fifth driving transistor TR11 so as to provide a current to the first node N1.

Figure 13:
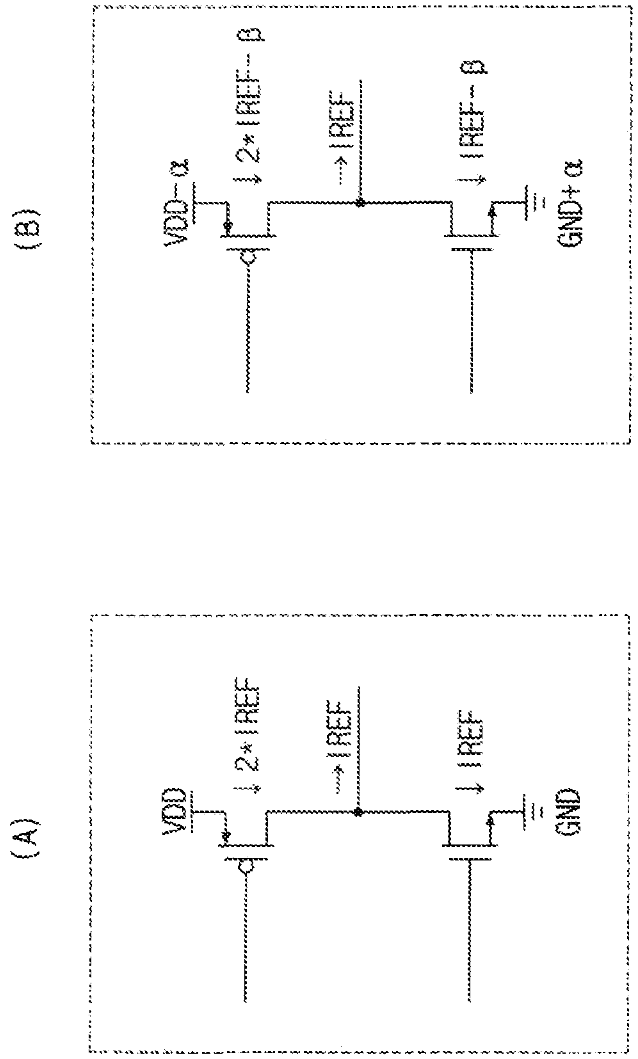
FIG. 13 is a view for describing a driving principle of a pseudo amplifier when a line resistance of a power supply line included in a data driver is generated.

FIG. 13 is a view for describing a driving principle of a pseudo amplifier when a line resistance of a power supply line included in a data driver is generated. For example, FIG. 13A is a circuit diagram showing a pseudo amplifier 350 in which a driving load cap is not generated, and FIG. 13B is a circuit diagram showing a pseudo amplifier 350 in which a driving load cap is generated.

Referring to FIG. 13, even when a voltage value is changed due to a line resistance generated as a power supply line extends to provide a power supply voltage to pseudo amplifiers 350 in a data driver, a reference current IREF output between driving transistors included in the pseudo amplifier 350 may not be changed. In other words, since the display device according to the present disclosure uses a difference between upper and lower currents in the driving transistors connected in series as the reference current IREF, a consistent reference current IREF may be generated even when the line resistance is generated as the power supply line extends.

Figure 14:
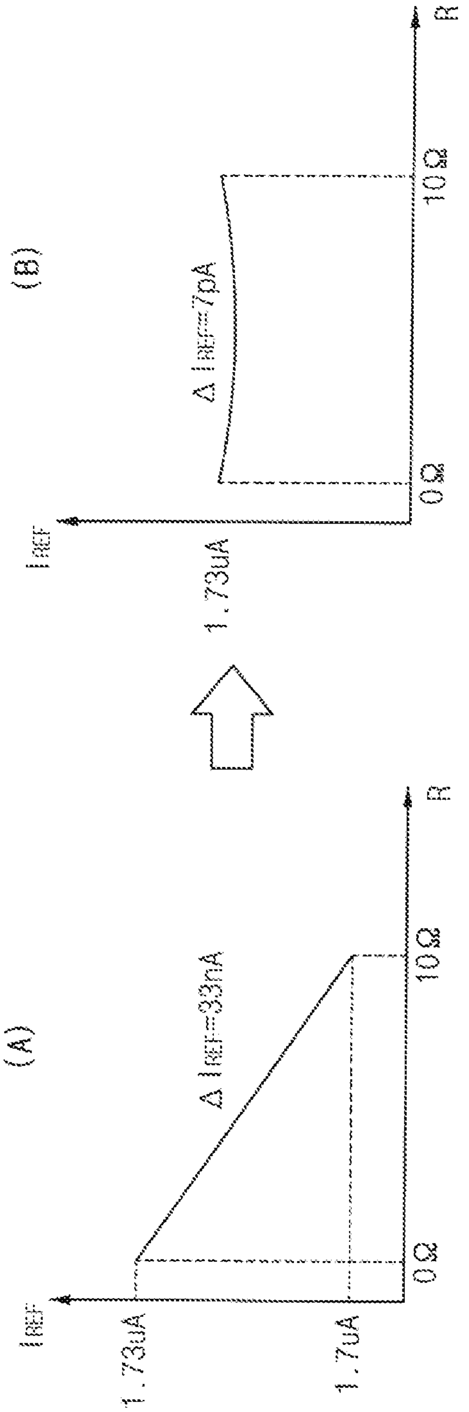
FIG. 14 is a graph showing a variation in a reference current according to a line resistance of a power supply line in the data driver of FIG. 13 and a variation in a reference current according to a line resistance of a power supply line in a data driver according to a comparative example.

FIG. 14 is a graph showing a variation in a reference current according to a line resistance of a power supply line in the data driver of FIG. 13 and a variation in a reference current according to a line resistance of a power supply line in a data driver according to a comparative example. For example, FIG. 14A is a graph showing the variation in the reference current according to the line resistance of the power supply line in a conventional data driver, and FIG. 14B is a graph showing the variation in the reference current IREF according to the line resistance of the power supply line in the data driver according to the present disclosure.

Referring to FIG. 14, according to a conventional display device, when a line resistance is generated as a power supply line extends, a reference current may be decreased as a length of the power supply line increases. On the contrary, according to a display device of the present disclosure, when a line resistance is generated as a power supply line extends, it may be found that a reference current IREF is maintained even when a length of the power supply line is increased.

Figure 15:
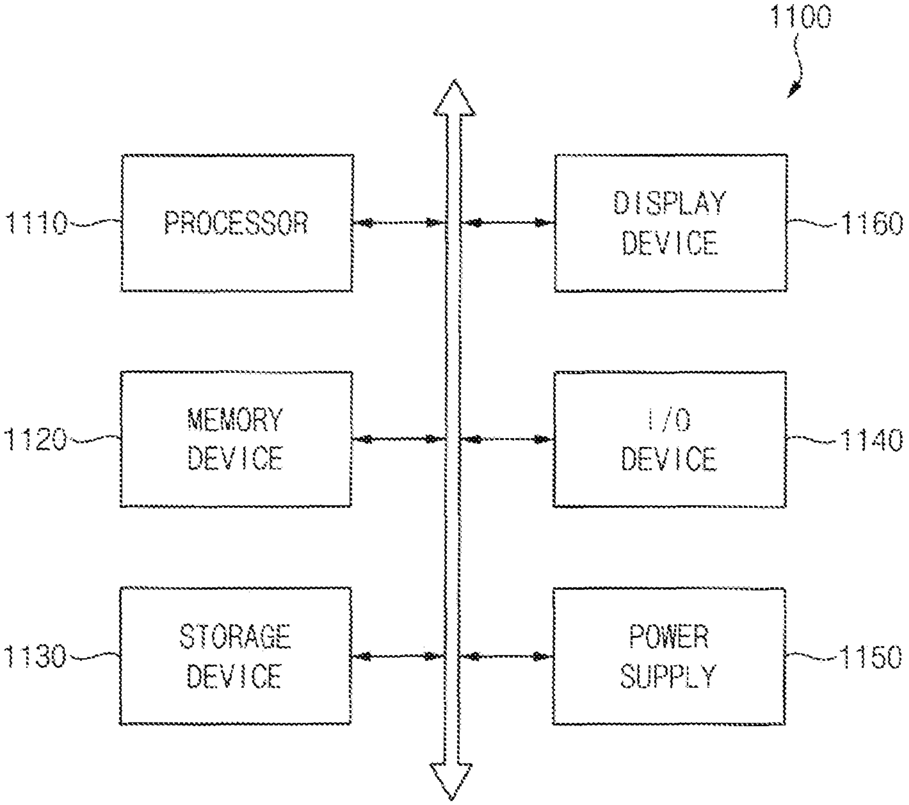
FIG. 15 is a block diagram illustrating an electronic device including a display device according to the present disclosure.

FIG. 15 is a block diagram illustrating an electronic device including a display device according to the present disclosure.

Referring to FIG. 11, an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro processor, a central processing unit (CPU), etc. The processor 1110 may be coupled to other components via an address bus, a control bus, a data bus, etc. Further, in embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc, and an output device such as a printer, a speaker, etc. The power supply 1150 may supply power for operations of the electronic device 1100. The OLED display device 1160 may be coupled to other components through the buses or other communication links.

The display device 1160 may include may include a display panel including a plurality of pixels, a controller, a gamma reference voltage generator, a data driver, a scan driver, a power supply unit, and the like. Here, the data driver may include a digital driver and an analog driver, and the digital driver may include a shift register, a latch, and the like. In addition, the analog driver may include a main amplifier, first digital-to-analog converters, a pseudo amplifier, second digital-to-analog converters, third digital-to-analog converters, buffers, and the like.

In embodiments, the current that is equal to the reference current generated by the main amplifier may be provided to the second resistor string of the second digital-to-analog converter through the first node and the second node. Since the second digital-to-analog converter is receiving a sufficient current from the pseudo amplifier, the second digital-to-analog converter may not receive a current from the first digital-to-analog converter. Accordingly, while the second digital-to-analog converter is connected to the first digital-to-analog converter, the current path of the second digital-to-analog converter may be separated from the first digital-to-analog converter by the pseudo amplifier. In other words, the display device 1160 includes the pseudo amplifier, so that the load effect in which the first resistor string of the first digital-to-analog converter and the second resistor string of the second digital-to-analog converter are connected to each other may not occur.

The inventive concepts may be applied to any light emitting display device 1160 supporting the variable frame mode, and any electronic device 1100 including the light emitting display device 1160. For example, the inventive concepts may be applied to a smart phone, a wearable electronic device, a tablet computer, a mobile phone, a television (TV), a digital TV, a 3D TV, a personal computer (PC), a home appliance, a laptop computer, a personal digital assistant (PDA), a portable multimedia player (PMP), a digital camera, a music player, a portable game console, a navigation device, etc.

The present disclosure may be applied to various electronic devices including a display device. For example, the present disclosure may be applied to numerous electronic devices such as vehicle-display devices, ship-display devices, aircraft-display devices, portable communication devices, exhibition display devices, information transfer display devices, medical-display devices, etc.

The foregoing is illustrative of embodiments and is not to be construed as limiting thereof. Although embodiments have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A data driver comprising:

a first digital-to-analog converter including a first resistor string including first resistors and a first decoder;

a second digital-to-analog converter including a second resistor string including second resistors and a second decoder, and connected to the first digital-to-analog converter;

a third digital-to-analog converter connected to the second digital-to-analog converter;

a first pseudo amplifier including first and second driving transistors;

a second pseudo amplifier including third and fourth driving transistors; and a main amplifier connected to the first and second pseudo amplifiers, and configured to generate a reference current, wherein the second resistor string is connected between first and second nodes, a first output node disposed between the first and second driving transistors is connected to the first node, and a second output node disposed between the third and fourth driving transistors is connected to the second node, wherein the main amplifier includes:

a first main amplifier including a fifth driving transistor and a sixth driving transistor, and wherein a gate terminal of the fifth driving transistor is connected to a gate terminal of the first driving transistor, and a gate terminal of the sixth driving transistor is connected to a gate terminal of the second driving transistor.

2. The data driver of claim 1, wherein the main amplifier further includes:

a second main amplifier including a seventh driving transistor and an eighth driving transistor.

3. The data driver of claim 1, wherein the first main amplifier further includes a first class AB controller configured to provide a gate voltage to the gate terminal of each of the fifth and sixth driving transistors.

4. The data driver of claim 3, wherein the first class AB controller is configured to detect a current of the first node, and maintain a current value of the first node to the reference current by adjusting the gate voltage provided to the gate terminal of each of the fifth and sixth driving transistors according to the current value of the first node.

5. The data driver of claim 2, wherein a gate terminal of the seventh driving transistor is connected to a gate terminal of the third driving transistor, and a gate terminal of the eighth driving transistor is connected to a gate terminal of the fourth driving transistor.

6. The data driver of claim 5, wherein the second main amplifier further includes a second class AB controller configured to provide a gate voltage to the gate terminal of each of the seventh and eighth driving transistors.

7. The data driver of claim 6, wherein the second class AB controller is configured to detect a current of the second node, and maintain a current value of the second node to the reference current by adjusting the gate voltage provided to the gate terminal of each of the seventh and eighth driving transistors according to the current value of the second node.

8. The data driver of claim 2, wherein the main amplifier further includes a third resistor string including third resistors, and connected to an output terminal of the first main amplifier and an output terminal of the second main amplifier, and the reference current flows through the third resistor string.

9. The data driver of claim 8, wherein the first main amplifier further includes a first class AB controller configured to provide a gate voltage to a gate terminal of each of the fifth and sixth driving transistors, the first class AB controller is configured to perform detection to maintain the reference current flowing through the third resistor string, and provide the reference current to the first node, the second main amplifier further includes a second class AB controller configured to provide a gate voltage to a gate terminal of each of the seventh and eighth driving transistors, and the second class AB controller is configured to perform detection to maintain the reference current flowing through the third resistor string, and provide the reference current to the second node.

10. The data driver of claim 2, wherein each of the fifth and seventh driving transistors includes a P-type driving transistor, and each of the sixth and eighth driving transistors includes an N-type driving transistor.

11. The data driver of claim 2, wherein a configuration of the fifth and sixth driving transistors included in the first main amplifier is identical to a configuration of the first and second driving transistors included in the first pseudo amplifier.

12. The data driver of claim 2, wherein a configuration of the seventh and eighth driving transistors included in the second main amplifier is identical to a configuration of the third and fourth driving transistors included in the second pseudo amplifier.

13. The data driver of claim 2, wherein the main amplifier includes a class AB amplifier.

14. The data driver of claim 2, wherein a size of each of the fifth to eighth driving transistors is different from a size of each of the first to fourth driving transistors.

15. The data driver of claim 14, wherein a magnitude of a current used in each of the fifth to eighth driving transistors is greater than a magnitude of a current flowing through each of the first to fourth driving transistors.

16. The data driver of claim 1, wherein each of the first and third driving transistors includes a P-type driving transistor, and each of the second and fourth driving transistors includes an N-type driving transistor.

17. The data driver of claim 1, further comprising:

a first control voltage driver for connecting the main amplifier to the first pseudo amplifier; and a second control voltage driver for connecting the main amplifier to the second pseudo amplifier.

18. The data driver of claim 17, wherein each of the first and second control voltage drivers includes a first channel, a second channel, and a mux, and is configured to alternately operate through the first and second channels to output a gate voltage without an offset.

19. A display device comprising:

a display panel including a plurality of pixels; and a data driver including a first digital-to-analog converter including a first resistor string including first resistors and a first decoder, a second digital-to-analog converter including a second resistor string including second resistors and a second decoder, and connected to the first digital-to-analog converter, a third digital-to-analog converter connected to the second digital-to-analog converter, a first pseudo amplifier including first and second driving transistors, a second pseudo amplifier including third and fourth driving transistors, and a main amplifier connected to the first and second pseudo amplifiers, and configured to generate a reference current, wherein the second resistor string is connected between first and second nodes, a first output node disposed between the first and second driving transistors is connected to the first node, and a second output node disposed between the third and fourth driving transistors is connected to the second node, wherein the main amplifier includes:

a first main amplifier including a fifth driving transistor and a sixth driving transistor, and wherein a gate terminal of the fifth driving transistor is connected to a gate terminal of the first driving transistor, and a gate terminal of the sixth driving transistor is connected to a gate terminal of the second driving transistor.

20. A data driver comprising:

a first digital-to-analog converter including a first resistor string including first resistors and a first decoder;

a second digital-to-analog converter including a second resistor string including second resistors and a second decoder, and connected to the first digital-to-analog converter;

a third digital-to-analog converter connected to the second digital-to-analog converter;

a first pseudo amplifier including first and second driving transistors;

a second pseudo amplifier including third and fourth driving transistors; and a main amplifier connected to the first and second pseudo amplifiers, wherein the first digital-to-analog converter is configured to output first and second coarse voltages and first and second preset voltages, the second resistor string is connected between first and second nodes, the first and second nodes are configured to receive the first and second coarse voltages, respectively, from the first digital-to-analog converter, the main amplifier is configured to receive the first and second preset voltages as inputs and generate a reference current as an output, a first output node disposed between the first and second driving transistors is connected to the first node, a second output node disposed between the third and fourth driving transistors is connected to the second node, and the first and second pseudo amplifiers are configured to apply the reference current from the first node to the second node.

* * * * *